(12) United States Patent
Kifuku

(10) Patent No.: US 7,272,479 B2
(45) Date of Patent: Sep. 18, 2007

(54) ELECTRICALLY OPERATED POWER STEERING CONTROLLER AND ADJUSTING METHOD OF DRIVING ELECTRIC CURRENT OFFSET IN THIS CONTROLLER

(75) Inventor: Takayuki Kifuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/979,242

(22) Filed: Nov. 3, 2004

(65) Prior Publication Data
US 2005/0280383 A1 Dec. 22, 2005

(30) Foreign Application Priority Data
Jun. 16, 2004 (JP) .......................... P2004-178735

(51) Int. Cl.
G06F 7/00 (2006.01)
G06F 17/00 (2006.01)
(52) U.S. Cl. .......................... 701/41; 701/42; 701/43; 701/44; 180/446; 180/443; 180/404; 180/444; 318/430; 318/431; 318/432; 318/433; 318/253; 318/599; 318/811
(58) Field of Classification Search ....................... None
See application file for complete search history.

(56) References Cited

U.S. PATENT DOCUMENTS

| | | | | |
|---|---|---|---|---|
| 4,765,426 A | * | 8/1988 | Shimizu ...................... | 180/446 |
| 5,982,137 A | * | 11/1999 | Endo ............................ | 318/812 |
| 6,212,447 B1 | * | 4/2001 | Kohge et al. .................... | 701/1 |
| 6,381,525 B1 | * | 4/2002 | Hori et al. ..................... | 701/41 |
| 6,407,524 B1 | * | 6/2002 | Endo et al. .................. | 318/432 |
| 6,427,104 B1 | * | 7/2002 | Matsushita et al. ............ | 701/41 |
| 6,450,287 B1 | * | 9/2002 | Kurishige et al. .......... | 180/446 |
| 6,459,971 B1 | * | 10/2002 | Kurishige et al. ............ | 701/41 |
| 6,577,024 B2 | * | 6/2003 | Kikuta et al. ............... | 307/10.1 |
| 6,681,165 B2 | * | 1/2004 | Shibasaki et al. ............. | 701/41 |
| 6,711,483 B2 | * | 3/2004 | Kimura et al. ................. | 701/41 |
| 6,779,626 B2 | * | 8/2004 | Matsuoka et al. .......... | 180/446 |
| 6,856,872 B2 | * | 2/2005 | Hironaka et al. ............. | 701/42 |
| 6,863,150 B1 | * | 3/2005 | Tanaka et al. .............. | 180/446 |
| 6,874,594 B2 | * | 4/2005 | Itakura et al. .............. | 180/446 |

(Continued)

FOREIGN PATENT DOCUMENTS

JP 8-175405 A 7/1996

(Continued)

Primary Examiner—Lincoln Donovan
Assistant Examiner—Robert W. Horn
(74) Attorney, Agent, or Firm—Sughrue Mion, PLLC

(57) ABSTRACT

The invention proposes an electrically operated power steering controller for inputting a driving electric current offset value of higher accuracy and being able to make an offset correction of a driving electric current by using this driving electric current offset value of higher accuracy, and an adjusting method of this driving electric current offset. Therefore, an electric motor driving electric current measuring device of accuracy higher than that of an electric motor driving electric current detector assembled into a controller CNT is prepared separately from this electric motor driving electric current detector. The driving electric current offset value of high accuracy is outputted by this electric motor driving electric current measuring device. An input device for receiving the driving electric current offset value of high accuracy from the driving electric current measuring device is arranged in an offset correcting device or an offset signal generator within the controller.

6 Claims, 4 Drawing Sheets

U.S. PATENT DOCUMENTS

| | | | |
|---|---|---|---|
| 6,885,927 B2* | 4/2005 | Arimura | 701/41 |
| 6,889,794 B2* | 5/2005 | Higashira et al. | 180/444 |
| 6,898,497 B2* | 5/2005 | Teramoto | 701/41 |
| 2002/0056587 A1* | 5/2002 | Shibasaki et al. | 180/443 |
| 2003/0075379 A1* | 4/2003 | Itakura et al. | 180/443 |
| 2003/0212476 A1* | 11/2003 | Aanen et al. | 701/1 |
| 2004/0186641 A1* | 9/2004 | Hironaka et al. | 701/42 |
| 2005/0125124 A1* | 6/2005 | Nagase et al. | 701/41 |
| 2006/0097676 A1* | 5/2006 | Katahira | 318/432 |

FOREIGN PATENT DOCUMENTS

| | | |
|---|---|---|
| JP | 10-278816 A | 10/1998 |
| JP | 11-069514 | 3/1999 |
| JP | 11-217080 | 8/1999 |
| JP | 2000-264239 A | 9/2000 |
| JP | 2004-058748 | 2/2004 |

* cited by examiner

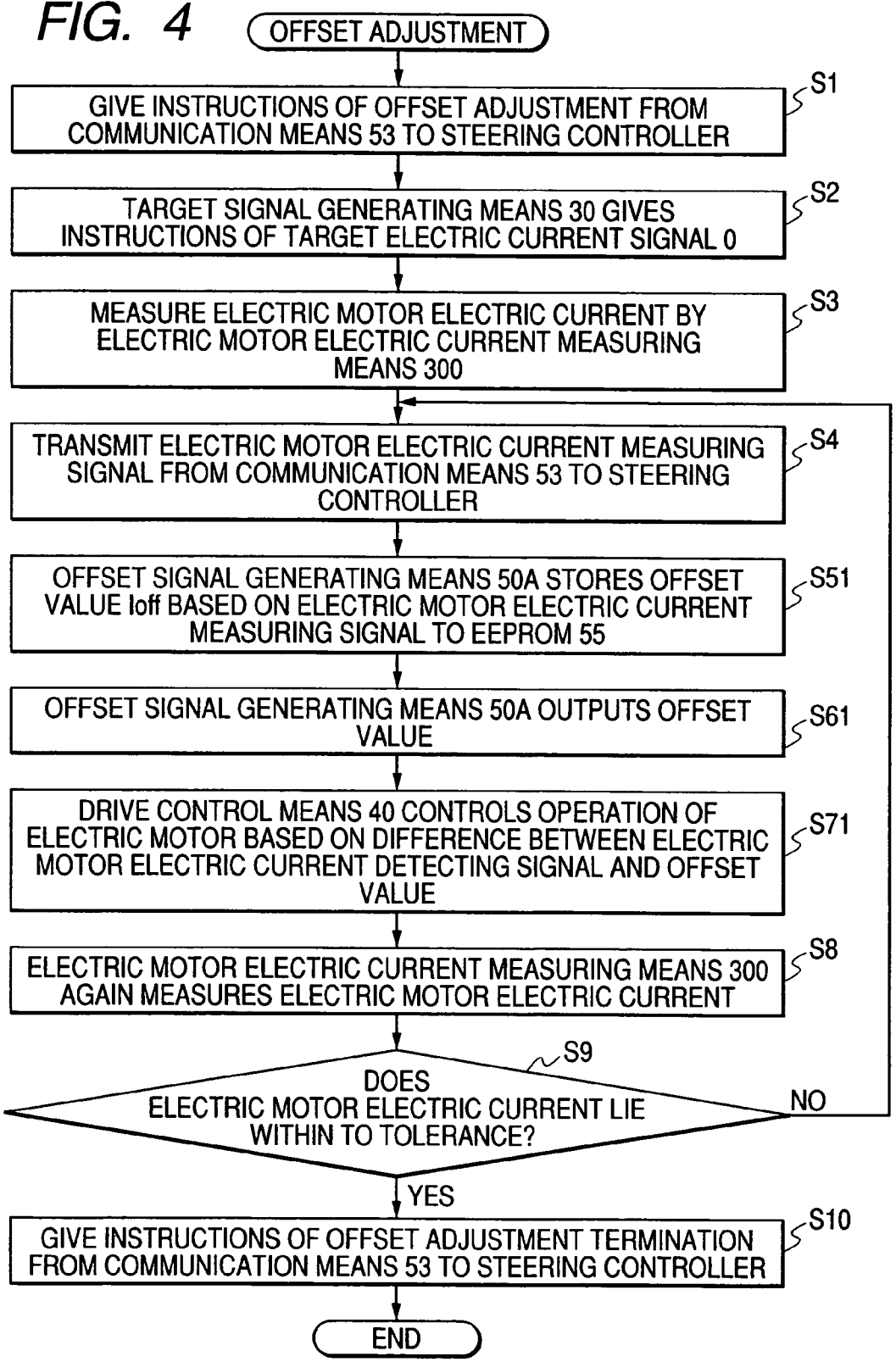

ELECTRICALLY OPERATED POWER STEERING CONTROLLER AND ADJUSTING METHOD OF DRIVING ELECTRIC CURRENT OFFSET IN THIS CONTROLLER

BACKGROUND OF THE INVENTION

1. Field of the Invention

This invention relates to an electrically operated power steering controller for controlling the operation of an electric motor for generating auxiliary steering torque and an adjusting method of its driving electric current offset.

2. Background Art

The electrically operated power steering controller disclosed in FIG. 2 of JP08-175405A includes an offset correcting means as well as a target signal generating means, an electric current detecting means and a drive control means. This electrically operated power steering controller controls the operation of the electric motor for generating the auxiliary steering torque. The target signal generating means calculates a driving electric current target value with respect to the electric motor, and generates a driving electric current target signal representing this driving electric current target value. The electric current detecting means detects the driving electric current value of the electric motor, and generates a driving electric current detecting signal representing this driving electric current value.

In this electrically operated power steering controller, the driving electric current of the electric motor is basically controlled by the driving control means such that the deviation between the driving electric current target value calculated by the target signal generating means and the driving electric current value detected by the electric current detecting means is zero. However, in the electrically operated power steering controller, the driving electric current value detected from the electric motor includes a driving electric current offset value even when the driving electric current target value with respect to the electric motor is zero. Therefore, the offset correcting means disclosed in the above prior art stores the driving electric current offset value when this driving electric current target value is zero, and makes an offset correction in consideration of this driving electric current offset value.

However, the offset correcting means disclosed in the above prior art stores the driving electric current offset value by using an output from the electric current detecting means for detecting the driving electric current value from the electric motor as it is. However, this electric current detecting means is a mass-produced product assembled into the electrically operated power steering controller, and its electric current detecting accuracy cannot be set to be so high from the restriction of cost. Therefore, the accuracy of the stored driving electric current offset value becomes low so that the accuracy of the offset correction also becomes low.

SUMMARY OF THE INVENTION

This invention proposes an improved electrically operated power steering controller able to introduce a more precise driving electric current offset value.

Further, this invention proposes an adjusting method of the driving electric current offset in the electrically operated power steering controller able to introduce a more precise driving electric current offset value into the electrically operated power steering controller.

According to a first aspect of this invention, it is proposed an electrically operated power steering controller for controlling the operation of an electric motor for generating auxiliary steering torque. The electrically operated power steering controller according to the first aspect includes driving electric current target signal generating means, driving electric current detecting means, offset correcting means and electric motor driving control means. The driving electric current target signal generating means generates a driving electric current target signal representing a driving electric current target value Itag for the electric motor. The driving electric current detecting means generates a driving electric current detecting signal representing a driving electric current value Imtr of the electric motor. The offset correcting means generates a corrected driving electric current signal representing a corrected driving electric current value Iamd provided by correcting the driving electric current value Imtr by using a driving electric current offset value Ioff of the electric motor when the driving electric current target value Itag is set to zero. The electric motor driving control means controls the operation of the electric motor on the basis of the driving electric current target signal and the corrected driving electric current signal. In the electrically operated power steering controller according to the first aspect, the offset correcting means has first and second input sections, the driving electric current detecting signal is inputted to the first input section, and input means for inputting a driving electric current offset signal representing the driving electric current offset value Ioff is connected to the second input section.

According to a second aspect of this invention, it is proposed an electrically operated power steering controller for controlling the operation of an electric motor for generating auxiliary steering torque. The electrically operated power steering controller according to the second aspect includes driving electric current target signal generating means, driving electric current detecting means, offset signal generating means, arithmetic means and electric motor driving control means. The driving electric current target signal generating means generates a driving electric current target signal representing a driving electric current target value Itag for the electric motor. The driving electric current detecting means generates a driving electric current detecting signal representing a driving electric current value Imtr of the electric motor. The offset signal generating means generates a driving electric current offset signal representing a driving electric current offset value Ioff of the electric motor when the driving electric current target value Itag is set to zero. The arithmetic means calculates an arithmetic value Iest=Itag−(Imtr−Ioff) on the basis of the driving electric current target signal, the driving electric current detecting signal and the driving electric current offset signal. The electric motor driving control means controls the operation of the electric motor on the basis of the arithmetic value. The electrically operated power steering controller according to the second aspect is constructed such that the driving electric current detecting signal and the driving electric current offset signal are supplied to the arithmetic means from routes different from each other, and input means for inputting the offset electric current signal representing the driving electric current offset value Ioff is connected to the offset signal generating means.

According to the first aspect, it is also proposed an adjusting method of a driving electric current offset in an electrically operated power steering controller including driving electric current target signal generating means, driving electric current detecting means, offset correcting means and electric motor driving control means. The driving electric current target signal generating means generates a driving electric current target signal representing a driving electric current target value Itag for an electric motor for generating auxiliary steering torque. The driving electric current detecting means generates a driving electric current detecting signal representing a driving electric current value Imtr of the electric motor. The offset correcting means generates a corrected driving electric current signal representing a corrected driving electric current value Iamd provided by correcting the driving electric current value Imtr by using a driving electric current offset value Ioff of the electric motor when the driving electric current target value Itag is set to zero. The electric motor driving control means controls the operation of the electric motor on the basis of the driving electric current target signal and the corrected driving electric current signal. In the electrically operated power steering controller according the first aspect, the offset correcting means has first and second input sections, the driving electric current detecting signal is inputted to the first input section, and input means for inputting an offset electric current signal representing the driving electric current offset value Ioff is connected to the second input section. The adjusting method according to the first aspect uses driving electric current measuring means different from the driving electric current detecting means. In the adjusting method according to the first aspect, the offset electric current signal representing the driving electric current offset value Ioff is inputted to the offset correcting means through the input means by this driving electric current measuring means.

According to the second aspect, it is also proposed an adjusting method of a driving electric current offset in an electrically operated power steering controller including driving electric current target signal generating means, driving electric current detecting means, offset signal generating means, arithmetic means and electric motor driving control means. The driving electric current target signal generating means generates a driving electric current target signal representing a driving electric current target value Itag for an electric motor for generating auxiliary steering torque. The driving electric current detecting means generates a driving electric current detecting signal representing a driving electric current value Imtr of the electric motor. The offset signal generating means generates a driving electric current offset signal representing a driving electric current offset value Ioff of the electric motor when the driving electric current target value Itag is set to zero. The arithmetic means calculates an arithmetic value Iest=Itag−(Imtr−Ioff) on the basis of the driving electric current target signal, the driving electric current detecting signal and the driving electric current offset signal. The electric motor driving control means controls the operation of the electric motor on the basis of the arithmetic value. The electrically operated power steering controller according to the second aspect is constructed such that the driving electric current detecting signal and the driving electric current offset signal are supplied to the arithmetic means from routes different from each other, and input means is connected to the offset signal generating means. The adjusting method according to the second aspect uses driving electric current measuring means different from the driving electric current detecting means, and the offset electric current signal representing the driving electric current offset value Ioff is inputted to the offset signal generating means through the input means by this driving electric current measuring means.

In the electrically operated power steering controller corresponding to the first aspect of this invention, the offset correcting means has the first and second input sections, and the driving electric current detecting signal is inputted to the first input section, and the input means for inputting the driving electric current offset signal representing the driving electric current offset value Ioff is connected to the second input section. Accordingly, the driving electric current offset signal representing the driving electric current offset value of high accuracy can be introduced from this input means irrespective of the driving electric current detecting means. Thus, the operation of the electric motor can be controlled with higher accuracy by using this driving electric current offset value of high accuracy.

Further, in the electrically operated power steering controller corresponding to the second aspect of this invention, the electrically operated power steering controller is constructed such that the driving electric current detecting signal and the driving electric current offset signal are supplied to the arithmetic means from routes different from each other, and the input means for inputting the driving electric current offset signal representing the driving electric current offset value Ioff is connected to the offset signal generating means. Accordingly, the driving electric current offset signal representing the driving electric current offset value of high accuracy can be introduced from this input means irrespective of the driving electric current detecting means. Thus, the operation of the electric motor can be controlled with higher accuracy by using this driving electric current offset value of high accuracy.

In the adjusting method of the driving electric current offset in the electrically operated power steering controller corresponding to the first aspect of this invention, the driving electric current measuring means different from the driving electric current detecting means is used, and the driving electric current offset signal representing the driving electric current offset value Ioff is inputted to the offset correction means through the input means by this driving electric current measuring means. Accordingly, the driving electric current offset signal representing the driving electric current offset value of high accuracy can be introduced into the electrically operated power steering controller by setting the measuring accuracy of the driving electric current measuring means to be higher than the detecting accuracy of the driving electric current detecting means. Thus, the electrically operated power steering controller can control the operation of the electric motor with higher accuracy by using this driving electric current offset value of higher accuracy.

Further, in the adjusting method of the driving electric current offset in the electrically operated power steering controller corresponding to the second aspect of this invention, the driving electric current measuring means different from the driving electric current detecting means is used, and the driving electric current offset signal representing the driving electric current offset value Ioff is inputted to the offset signal generating means through the input means by this driving electric current measuring means. Accordingly, the driving electric current offset signal representing the driving electric current offset value of high accuracy can be introduced into the electrically operated power steering controller by setting the measuring accuracy of the driving electric current measuring means to be higher than the detecting accuracy of the driving electric current detecting means. Thus, the electrically operated power steering controller can control the operation of the electric motor with higher accuracy by using this driving electric current offset value of higher accuracy.

BRIEF DESCRIPTION OF THE DRAWINGS

FIG. 4 is a flow chart showing an adjusting method of the driving electric current offset of the electrically operated power steering controller of the embodiment 2.

DESCRIPTION OF THE PREFERRED EMBODIMENTS

Some embodiments of this invention will next be explained with reference to the drawings.

Embodiment 1

This embodiment 1 is an embodiment corresponding to a first aspect of this invention, and includes an electrically operated power steering controller in this invention, and an adjusting method of a driving electric current offset in the electrically operated power steering controller in this invention.

Figure 1:
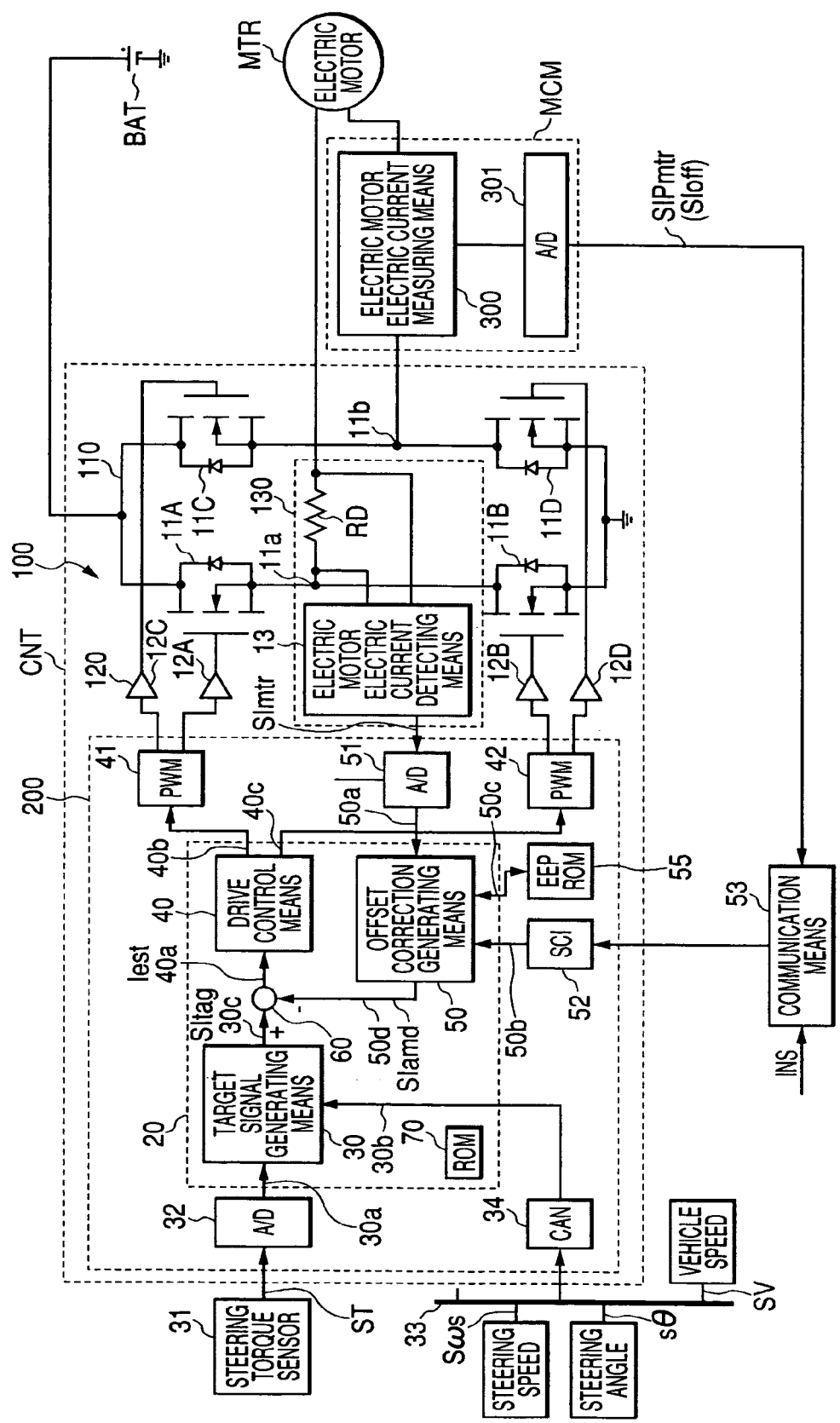
FIG. 1 is a block diagram showing an embodiment 1 of an electrically operated power steering controller in this invention.

FIG. 1 is a block diagram showing the electrically operated power steering controller in this embodiment 1. This electrically operated power steering controller is mounted to an automobile, and includes a controller CNT, a direct current power source BAT, an electric motor MTR and an electric motor driving electric current measuring means MCM. The controller CNT, the direct current power source BAT and the electric motor MTR are mounted to the automobile, but the electric motor driving electric current measuring circuit MCM is arranged in a manufacturing factory or a repairing factory of the automobile or automobile parts. When an adjusting process of the driving electric current offset is executed with respect to the electrically operated power steering controller, the electric motor driving electric current measuring circuit MCM is combined with the controller CNT, the direct current power source BAT and the electric motor MTR. For example, the direct current power source BAT is a battery mounted to the automobile.

The electric motor MTR is assembled into a steering mechanism of the automobile, and gives auxiliary steering torque for assisting steering torque provided by a driver to the steering mechanism. The steering mechanism of the automobile has a steering handle operated by the driver, a steering shaft operated by this steering handle, and a gear box connected to this steering shaft. The steering mechanism steers a steering wheel of the automobile through the steering shaft and the gear box on the basis of the steering torque given to the steering handle. The electric motor MTR is connected to the steering shaft through a speed reduction gear, and gives the auxiliary steering torque for assisting the steering torque to the steering shaft. For example, a direct current electric motor is used as this electric motor MTR.

The controller CNT includes a power driving circuit 100 with respect to the electric motor MTR, and a control unit 200 for controlling the operation of this power driving circuit 100. The power driving circuit 100 includes a switch circuit 110 connected to the direct current power source BAT and switching the polarities of its direct current voltage, a gate driving circuit 120 with respect to this switch circuit 110, and an electric motor driving electric current detecting circuit 130.

The switch circuit 110 includes two power switch elements 11A, 11B connected in series, and power switch elements 11C, 11D connected in series. The connecting portion between the power switch elements 11A and 11B constitutes a first output terminal 11a. The connecting portion between the power switch elements 11C and 11D constitutes a second output terminal 11b.

The electric motor MTR is connected between the first output terminal 11a and the second output terminal 11b, and the operation of the electric motor MTR is controlled by the switch circuit 110 in a first or second control state. In the first control state, for example, the electric motor MTR is rotated in the positive direction in a controlled driving duty ratio. In the second control state, for example, the electric motor MTR is rotated in the reverse direction in the controlled driving duty ratio.

In the first control state, both the power switch elements 11B, 11C are turned off, and both the power switch elements 11A, 11D are periodically turned on in the controlled driving duty ratio. When the power switch elements 11A, 11D are turned on in this first control state, an electric current is flowed from the power switch element 11A to the power switch element 11D via the first output terminal 11a, the electric motor MTR and the second output terminal 11b. When the electric current flowed to the electric motor MTR is set to have a positive polarity in this first control state, the electric motor MTR is rotated in the positive direction in the driving duty ratio and is operated by the electric current of the positive polarity in the first control state.

In the second control state, both the power switch elements 11A, 11D are turned off, and both the power switch elements 11B, 11C are periodically turned on in the controlled duty ratio. When the power switch elements 11B, 11C are turned on in this second control state, the electric current is flowed from the power switch element 11C to the power switch element 11B via the second output terminal 11b, the electric motor MTR and the first output terminal 11a. When the electric current flowed to the electric motor MTR in this second control state is set to have a reverse polarity, the electric motor MTR is rotated in the reverse direction in the driving duty ratio and is operated by the electric current of the reverse polarity in the second control state.

For example, a power MOSFET is used in the power switch elements 11A, 11B, 11C, 11D. This power MOSFET has a gate for controlling its turning on and off operations, and attains a turning-on state when a driving pulse is given to the gate. A gate driving circuit 120 has driving pulse circuits 12A, 12B, 12C, 12D for supplying the driving pulse to the respective gates of the power switch elements 11A, 11B, 11C, 11D.

The electric motor driving electric current detecting circuit 130 generates a driving electric current detecting signal SImtr representing a driving electric current value Imtr of the electric motor MTR. This electric motor driving electric current detecting circuit 130 includes a detecting resistor RD and a driving electric current detecting means 13. The detecting resistor RD is connected between the first output terminal 11a and the electric motor MTR. The driving electric current detecting means 13 detects the voltage generated at both the ends of a detecting resistor 21 on the basis of the driving electric current value Imtr of the electric motor MTR, and generates the driving electric current detecting signal SImtr representing the driving electric current value Imtr.

The electric motor driving electric current detecting circuit 130 is assembled into the controller CNT. The controller CNT is a mass-produced controller mounted to the automobile and including the electric motor driving electric current detecting circuit 130. There is a restriction in cost of this controller CNT to mass-produce this controller CNT. Since this restriction of cost is similarly applied to the electric motor driving electric current detecting circuit 130, the electric motor driving electric current detecting circuit 130 and an A/D converter 51 are also made at relatively low cost, and its detecting accuracy of the driving electric current value Imtr is not so high.

Similar to the electric motor driving electric current detecting circuit 130, the electric motor driving electric current measuring circuit MCM measures the driving electric current value Imtr of the electric motor MTR. However, this electric motor driving electric current measuring circuit MCM is not mounted to the automobile, but is arranged in a manufacturing factory of the automobile or automobile parts or a repairing factory of the automobile. Only a small number of electric motor driving electric current measuring circuits MCM are arranged in the manufacturing factory of the automobile or the automobile parts, or the repairing factory, and are not restricted so much in cost. Accordingly, the electric motor driving electric current measuring circuit MCM is constructed so as to generate a driving electric current measuring signal SIPmtr in which the driving electric current value Imtr is measured with high accuracy in comparison with the electric motor driving electric current detecting circuit 130. This electric motor driving electric current measuring circuit MCM has an electric motor driving electric current measuring means 300 and an A/D converter 301. This electric motor driving electric current measuring means 300 is connected between the second output terminal 11*b* and the electric motor MTR, and outputs a driving electric current measuring signal (analog) of high accuracy. The A/D converter 301 of high accuracy is connected to the output of the electric motor driving electric current measuring means 300, and this A/D converter 301 outputs the driving electric current measuring signal SIPmtr of high accuracy in which the driving electric current measuring signal of high accuracy is converted into a digital format.

The control unit 200 is constructed with a microcomputer 20 as a center. This microcomputer 20 includes a driving electric current target signal generating means 30, an electric motor driving control means 40, an offset correcting means 50, an arithmetic means 60 and a ROM 70. The ROM 70 is a read only memory for storing a program required in the microcomputer 20. The operations of the driving electric current target signal generating means 30, the electric motor driving control means 40, the offset correcting means 50 and the arithmetic means 60 are respectively executed by using a CPU and a RAM of the microcomputer 20 on the basis of the program stored to the ROM 70.

The driving electric current target signal generating means 30 calculates a driving electric current target value Itag with respect to the electric motor MTR, and generates a driving electric current target signal SItag representing this driving electric current target value Itag. This driving electric current target signal generating means 30 has two input sections 30*a*, 30*b* and one output section 30*c*. A steering torque signal ST representing steering torque T from a steering torque sensor 31 is fetched into the input section 30*a* through an A/D converter 32. Various kinds of signals are fetched from a network 33 within the automobile into the input section 30*b* through a control area network (CAN) 34. A vehicle speed signal SV representing a vehicle speed V of the automobile, a steering angle signal Sθ representing the steering angle θ of a steering handle, and a steering speed signal Sωs representing a rotating speed ωs of the steering shaft of the steering mechanism are transmitted in the network 33. The driving electric current target signal generating means 30 calculates the driving electric current target value Itag on the basis of the steering torque signal ST, the vehicle speed signal SV, the steering angle signal Sθ and the steering speed signal Sωs, and generates the driving electric current target signal SItag representing this driving electric current target value Itag in the output section 30*c*. This driving electric current target signal SItag is supplied to the arithmetic means 60. This arithmetic means 60 outputs a driving electric current arithmetic value Iest.

The electric motor driving control means 40 has one input section 40*a* and two output sections 40*b*, 40*c*. The input section 40*a* is connected to the arithmetic means 60. The output sections 40*b*, 40*c* are respectively connected to pulse width modulating circuits (PWM) 41, 42. These pulse width modulating circuits 41, 42 give a controlled driving duty ratio to the respective driving pulse circuits 12A to 12D of the gate driving circuit 120. The electric motor driving control means 40 controls the driving duty ratio outputted from the pulse width modulating circuits 41, 42 on the basis of the driving electric current arithmetic value Iest from the arithmetic means 60, and controls the driving electric current value Imtr with respect to the electric motor MTR.

When the driving electric current target value Itag is given to the electric motor driving control means 40, the electric motor driving control means 40 basically controls the operations of the pulse width modulating circuits 41, 42 and controls the driving electric current Imtr of the electric motor MTR by the gate driving circuit 120 such that the driving electric current value Imtr is equal to this driving electric current target value Itag. However, even when the driving electric current target value Itag is set to zero, the electric current of a predetermined driving electric current offset value Ioff is flowed to the electric motor MTR. Accordingly, the driving electric current value Imtr is corrected by the offset correction means 50.

A corrected driving electric current value Iamd given from the offset correcting means 50 to the arithmetic means 60 is represented by the following formula (1).

$$Iamd=Imtr-Ioff \qquad (1)$$

The arithmetic means 60 calculates the driving electric current arithmetic value Iest by the following formula (2).

$$Iest=Itag-Iamd=Itag-Imtr+Ioff \qquad (2)$$

The offset correcting means 50 has two input sections 50*a*, 50*b*, one input-output section 50*c* and one output section 50*d*. The driving electric current detecting signal SImtr representing the driving electric current value Imtr from the electric motor electric current detecting circuit 130 is converted into a digital signal by an A/D converter 51 and is inputted to the input section 50*a*. An input means 52 is connected to the input section 50*b*. This input means 52 is an input means called a serial communication interface (SCI), and the driving electric current offset value Ioff of high accuracy from the electric motor driving electric current measuring circuit MCM is inputted in a digital format to this input means 52 through a communication means 53. A nonvolatile memory (EEPROM) 55 is connected to the input-output section 50*c*. The output section 50*d* supplies a correcting driving electric current signal SIamd representing the corrected driving electric current value Iamd to the arithmetic means 60.

The offset adjusting process of the driving electric current is executed in the manufacturing factory of the automobile or the automobile parts, or the repairing factory by using the electric motor driving electric current measuring circuit MCM. In this offset adjusting process, the driving electric current offset value Ioff is really measured with the controller CNT and the electric motor MTR combined with this controller CNT as objects. This driving electric current offset value Ioff is adjusted such that the driving electric current target signal generating means 30 of the controller CNT sets the driving electric current target value Itag to zero. Then, the driving electric current value Imtr of the driving electric current flowed to the electric motor MTR at this time is really measured by the electric motor driving electric current measuring circuit MCM. The electric motor driving electric current measuring circuit MCM outputs the driving electric current measuring signal SIPmtr of high accuracy, but the driving electric current measuring signal SIPmtr provided by setting the driving electric current target value Itag to zero becomes a driving electric current offset signal SIoff representing the driving electric current offset value Ioff.

This driving electric current offset signal SIoff from the electric motor driving electric current measuring circuit MCM is supplied to the input means 52 through the communication means 53, and is stored and held in the nonvolatile memory 55 through the offset correcting means 50. This driving electric current offset value Ioff is held in the nonvolatile memory 55 until the driving electric current offset value Ioff is readjusted thereafter.

The ROM 70 of the microcomputer 20 includes a program for fetching the driving electric current offset signal SIoff from the input means 52 to the offset correcting means 50, and a program for storing and holding the fetched driving electric current offset value Ioff in the nonvolatile memory 55. The fetching operation of the driving electric current offset signal SIoff to the offset correcting means 50, and the storing and holding operations of the offset value Ioff to the nonvolatile memory 55 are executed by using these programs of the ROM 70.

After the offset adjusting process is terminated in the manufacturing factory of the automobile or the automobile parts, or the repairing factory, the offset correcting means 50 of the controller CNT mounted to the automobile calculates the corrected driving electric current value Iamd on the basis of the formula (1) in an operating state of the automobile. In this case, the driving electric current value Imtr is fetched from the driving electric current detecting signal SImtr from the driving electric current detecting circuit 130 assembled into the controller CNT. In this operating state of the automobile, the arithmetic means 60 calculates the driving electric current arithmetic value Iest by the formula (2), and the driving electric current value Imtr of the electric motor MTR is controlled on the basis of this driving electric current arithmetic value Iest.

Figure 2:
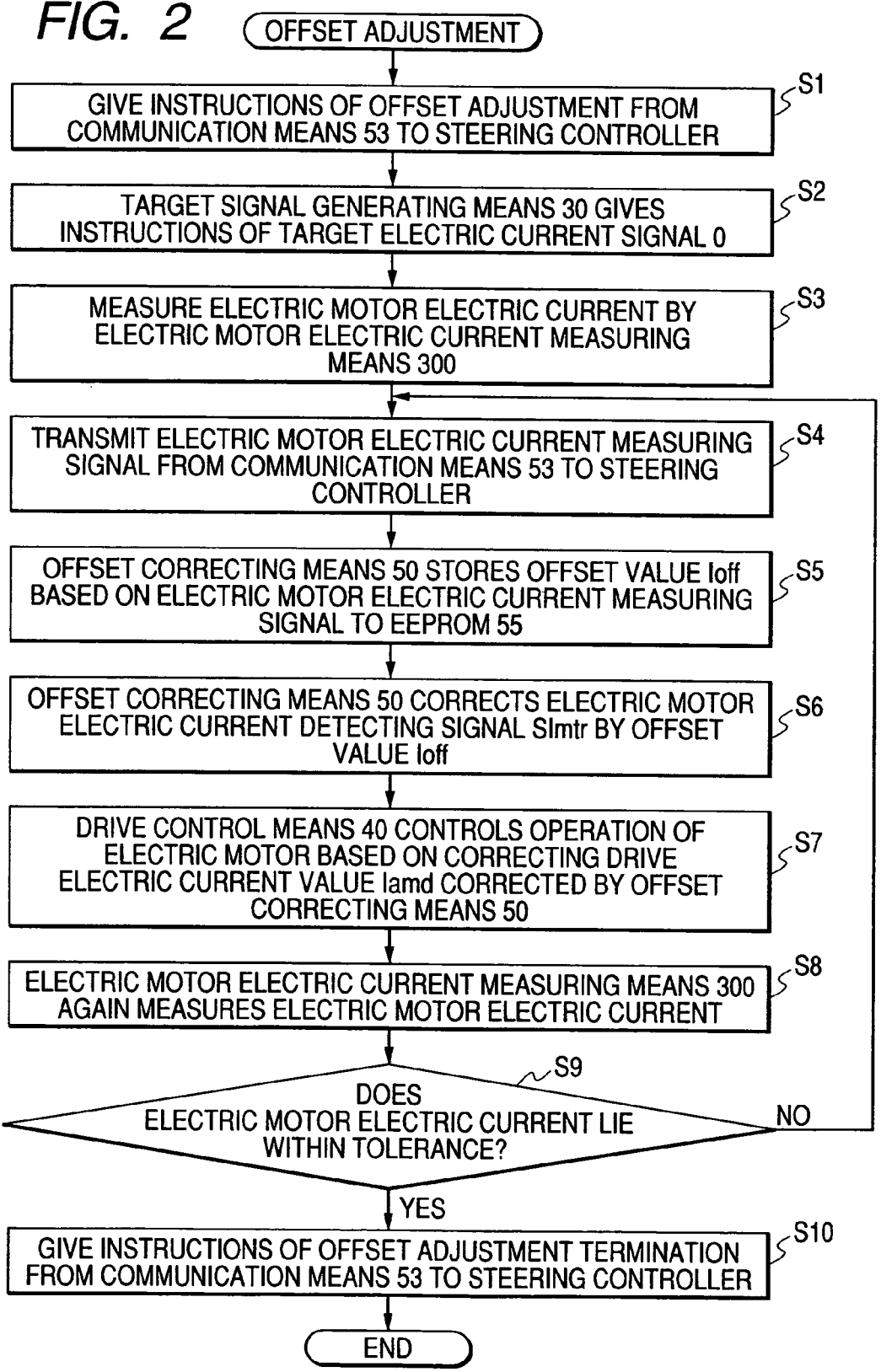
FIG. 2 is a flow chart showing an adjusting method of a driving electric current offset of the electrically operated power steering controller of the embodiment 1.

FIG. 2 shows a flow chart of the adjusting process of the driving electric current offset in the embodiment 1. This flow chart of FIG. 2 includes ten steps from step S1 to step S10. As mentioned above, the adjusting process of this offset is executed in the manufacturing factory of the automobile or the automobile parts, or the repairing factory. The controller CNT is separated from the steering torque sensor 31, the network 33 within the automobile, and the direct current power source BAT, and is connected to a direct current power source within a factory similar to the direct current power source BAT.

First, in the step S1, instructions of the offset adjustment are given from the communication means 53 to the controller CNT by using an instruction signal INS. These offset adjusting instructions are fetched to the microcomputer 20 through the input means 52 and the offset correcting means 50. The microcomputer 20 stops control based on information from the steering torque sensor 31 and the network 33 within the automobile. In the next step S2, the driving electric current target signal generating means 30 generates a driving target signal SItag with the driving electric current target value Itag as zero.

In the next step S3, the electric motor driving electric current measuring circuit MCM measures the driving electric current of the electric motor MTR corresponding to the driving electric current target value Itag=0, and generates an offset signal SIoff (digital) representing the driving electric current offset value Ioff of the electric motor MTR. In a step S4, this offset signal SIoff is inputted from the communication means 53 to the offset correcting means 50 through the input means 52.

In the next step S5, the offset correcting means 50 stores the driving electric current offset value Ioff to the nonvolatile memory 55 on the basis of the fetched offset signal SIoff. In a step S6, the offset correcting means 50 calculates and outputs a corrected driving electric current value Iamd by using a detecting signal SImtr from the electric motor electric current detecting circuit 130 and the driving electric current offset value Ioff stored and held in the nonvolatile memory 55. At this time, since the driving electric current target value Itag=0 is set, an arithmetic value Iest=Iamd=Imtr−Ioff is outputted from the arithmetic means 60.

In the next step S7, the electric motor driving control means 40 controls the operation of the electric motor MTR through the pulse width modulating circuits 41, 42, the gate driving circuit 120 and the switch circuit 110 on the basis of the arithmetic value Iest from the arithmetic means 60. In a step S8, the driving electric current value Imtr of the electric motor MTR is again measured by using the electric motor driving electric current measuring circuit MCM.

In the next step S9, it is judged whether the driving electric current value Imtr of the electric motor measured in the step S8 lies within a predetermined tolerance or not. If this judging result is "yes", the instructions of termination of the offset adjustment are given by an instruction signal INS from the communication means 53 in a step S10, and the offset adjusting process is terminated. In contrast to this, when the judging result of the step S9 is "no", it is returned to the step S4, and the adjustment of the driving electric current offset is again made. At the readjusting time, a driving electric current offset signal SIoff (n) based on the measuring result in the step S8 is sent out in the step S4. In the step S5, a new driving electric current offset value Ioff is stored to the nonvolatile memory 55 on the basis of the driving electric current offset signal SIoff (n−1) sent out in the previous step S4 and the above driving electric current offset signal SIoff (n).

As mentioned above, in the electrically operated power steering controller in the embodiment 1, the offset correcting means 50 has the first input section 50*a* and the second input section 50*b*. The driving electric current detecting signal SImtr from the driving electric current detecting circuit 130 is inputted to the first input section 50*a*. The input means 52 for inputting the driving electric current offset signal SIoff representing the driving electric current offset value Ioff is connected to the second input section 50b. Accordingly, the driving electric current offset signal SIoff repsenting the driving electric current offset value Ioff of high accuracy can be introduced from this input means 52 irrespective of the driving electric current detecting circuit 130. Thus, the operation of the electric motor MTR can be controlled with higher accuracy by using this driving electric current offset value of high accuracy.

Further, in the embodiment 1, the driving electric current offset signal SIoff is fetched to the offset correcting means 50 by the program stored to the ROM 70 of the microcomputer 20, and is stored and held in the nonvolatile memory 55. Accordingly, the fetching operation of the driving electric current offset value Ioff and the storing and holding operations can be simply performed. In addition, the memory 55 is a nonvolatile memory and can reliably hold the driving electric current offset value Ioff until the driving electric current offset value Ioff is next rewritten.

Further, in the adjusting method of the driving electric current offset in the electrically operated power steering controller in the embodiment 1, the driving electric current measuring means 300 different from the driving electric current detecting means 13 is used and the offset electric current signal SIoff representing the driving electric current offset value Ioff is inputted to the offset correcting means 50 through the input means 52 by this driving electric current measuring means 300. Accordingly, the driving electric current offset signal SIoff representing the driving electric current offset value Ioff of high accuracy can be introduced into the electrically operated power steering controller by setting the measuring accuracy of the driving electric current measuring means 300 to be higher than the detecting accuracy using the driving electric current detecting means 13 and the A/D converter 51. Thus, the electrically operated power steering controller can control the operation of the electric motor with higher accuracy by using this driving electric current offset value of higher accuracy.

Further, in the adjusting method of the driving electric current offset of the electrically operated power steering controller in the embodiment 1, since the driving electric current offset signal SIoff is fetched to the offset correcting means 50 through the input means 52 as a digital signal, noise resisting characteristics of the driving electric current offset signal SIoff can be also improved.

Embodiment 2

This embodiment 2 is an embodiment corresponding to a second aspect of this invention, and includes an electrically operated power steering controller in this invention, and an adjusting method of the driving electric current offset in the electrically operated power steering controller in this invention.

Figure 3:
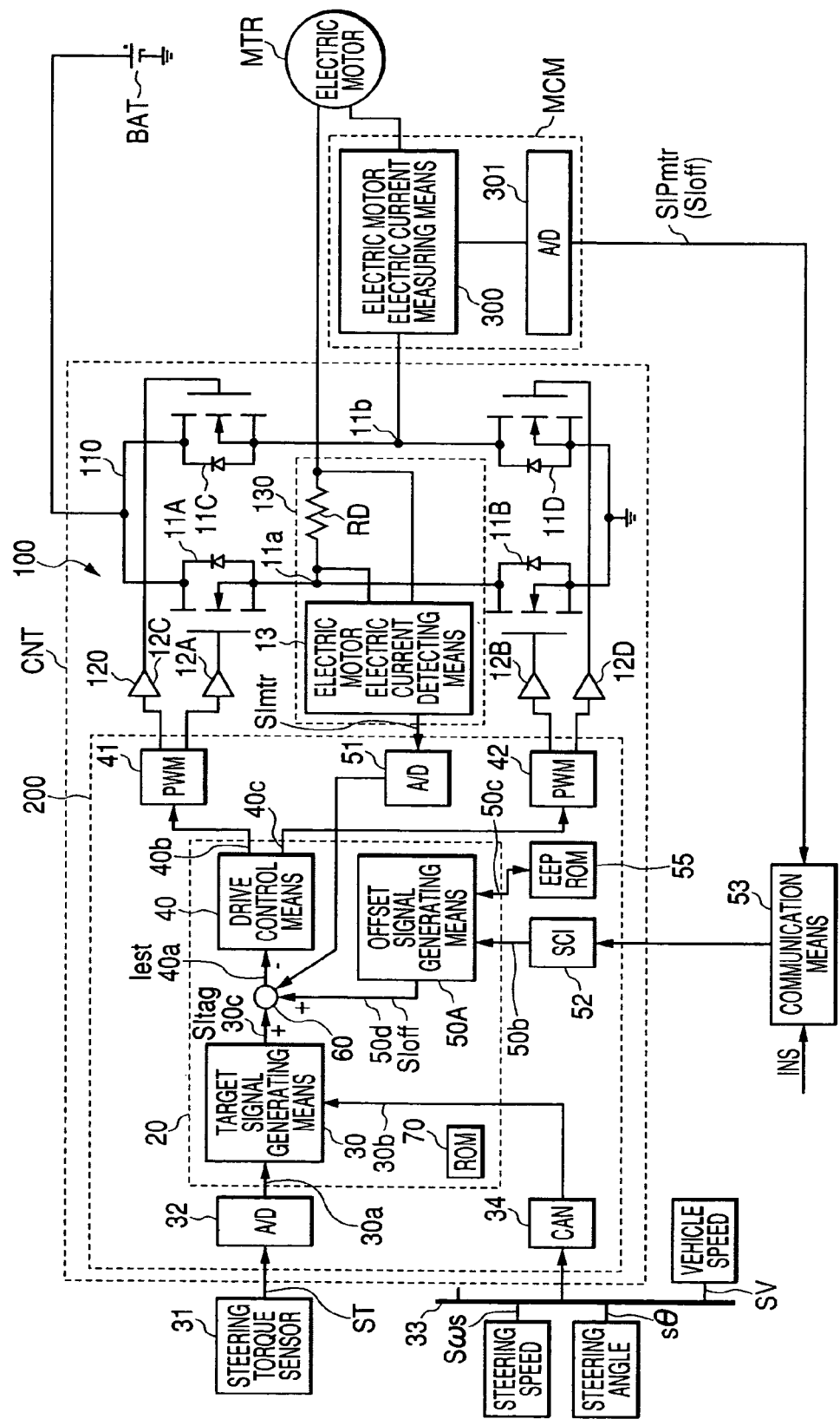
FIG. 3 is a block diagram showing an embodiment 2 of the electrically operated power steering controller in this invention.

FIG. 3 is a block diagram showing the electrically operated power steering controller in this embodiment 2. In the electrically operated power steering controller in this embodiment 2, an offset signal generating means 50A is substituted for the offset correcting means 50 in the embodiment 1, and the driving electric current detecting signal SImtr reprenting the driving electric current value Imtr of the electric motor MTR from the electric motor driving electric current detecting means 13 is directly inputted to the arithmetic means 60. The other constructions are the same as the embodiment 1.

In the offset signal generating means 50A of FIG. 3, the input section 50a is omitted. This offset signal generating means 50A of FIG. 3 has an input section 50b connected to the input means 52, an input-output section 50c connected to the nonvolatile memory 55, and an output section 50d connected to the arithmetic means 60.

In the adjusting process of the driving electric current offset similar to that in the embodiment 1, a driving electric current offset signal SIoff representing a driving electric current offset value Ioff measured with high accuracy by the electric motor driving electric current measuring means 300 is fetched from the input means 52 to the offset signal generating means 50A in the input section 50b of the offset signal generating means 50A, and is stored and held in the nonvolatile memory 55. The offset signal generating means 50A generates the driving electric current offset signal SIoff representing the driving electric current offset value Ioff of high accuracy in the output section 50d of this offset signal generating means 50A, and supplies this driving electric current offset signal SIoff to the arithmetic means 60.

In the embodiment 2, the arithmetic means 60 calculates a driving electric current arithmetic value Iest on the basis of the following formula (3) by using a driving electric current target signal SItag representing a driving electric current target value Itag from the driving electric current target signal generating means 30, a driving electric current detecting signal SImtr representing a driving electric current value Imtr from the driving electric current detecting means 13, and the driving electric current offset signal SIoff representing the driving electric current offset value Ioff from the offset signal generating means 50A.

$$Iest = Itag - Imtr + Ioff \qquad (3)$$

In the adjusting process of the driving electric current offset, driving electric current target value Itag=0 is set. Accordingly, the arithmetic value Iest using the following formula (4) is calculated.

$$Iest = -Imtr + Ioff \qquad (4)$$

The adjusting process of the driving electric current offset of the electrically operated power steering controller of this embodiment 2 is executed by the flow chart of FIG. 4. Similar to the embodiment 1, this adjusting process of the driving electric current offset is executed in the manufacturing factory of the automobile or the automobile parts, or the repairing factory.

Steps S1 to S4 of FIG. 4 are the same as steps S1 to S4 of FIG. 2, and steps S8 to S10 of FIG. 4 are also the same as steps S8 to S10 of FIG. 2.

In a step S51 of FIG. 4, the offset signal generating means 50A stores the driving electric current offset value Ioff of high accuracy from the driving electric current measuring means 300 to the nonvolatile memory 55. In a step S61, the offset signal generating means 50A generates the driving electric current offset signal SIoff representing the driving electric current offset value Ioff of high accuracy in the output section 50d. In a step S71, the electric motor driving control means 40 drives the electric motor MTR by the difference between the arithmetic value Iest based on the formula (4), i.e., the driving electric current value Imtr and the driving electric current offset value Ioff of high accuracy.

As mentioned above, in the embodiment 2 of the electrically operated power steering controller in this invention, it is constructed such that the driving electric current detecting signal SImtr from the electric motor driving electric current detecting means 13 and the driving electric current offset signal SIoff from the offset signal generating means 50A are supplied to the arithmetic means 60 from routes different from each other. Further, the input means 52 for inputting the driving electric current offset signal SIoff representing the driving electric current offset value Ioff is connected to the offset signal generating means 50A. Accordingly, the driving electric current offset signal SIoff representing the driving electric current offset value Ioff of high accuracy can be introduced from this input means 52 irrespective of the driving electric current detecting means 13. Thus, the operation of the electric motor can be controlled with higher accuracy by using this driving electric current offset value of high accuracy.

Further, similar to the embodiment 1, the driving electric current offset signal SIoff is fetched to the offset signal generating means 50A by a program stored to the ROM 70 of the microcomputer 20 in the embodiment 2. Further, this driving electric current offset value Ioff is stored and held in the memory 55. Accordingly, the fetching, storing and holding operations of the driving electric current offset value Ioff can be simply performed. In addition, the memory 55 is a nonvolatile memory and can reliably hold the driving electric current offset value Ioff until the driving electric current offset value Ioff is next rewritten.

Further, in the adjusting method of the driving electric current offset in the electrically operated power steering controller in the embodiment 2, the driving electric current measuring means 300 different from the driving electric current detecting means 13 is used, and the offset electric current signal SIoff representing the driving electric current offset value Ioff is inputted to the offset signal generating means 50A through the input means 52 by this driving electric current measuring means 300. Accordingly, the driving electric current offset signal SIoff representing the driving electric current offset value Ioff of high accuracy can be introduced into the electrically operated power steering controller by setting the measuring accuracy of the driving electric current measuring means 300 to be higher than the detecting accuracy using the driving electric current detecting means 13 and the A/D converter 51. Thus, the electrically operated power steering controller can control the operation of the electric motor with higher accuracy by using this driving electric current offset value of higher accuracy.

Further, in the adjusting method of the driving electric current offset of the electrically operated power steering controller in the embodiment 2, since the driving electric current offset signal SIoff is fetched to the offset correcting means 50 through the input means 52 as a digital signal, noise resisting characteristics of the driving electric current offset signal SIoff can be also improved.

Embodiment 3

In the embodiments 1 and 2, the direct current electric motor is used as the electric motor MTR. However, in this embodiment 3, a three-phase brushless alternating current electric motor is used, and an electric motor driving electric current measuring circuit MCM is arranged in each phase, and driving electric current offset values Ioff-a, Ioff-b, Ioff-c of the respective phases are stored and held in the nonvolatile memory 55. Further, in accordance with this construction, the electric motor driving electric current detecting circuit 130 also detects driving electric current values Imtr-a, Imtr-b, Imtr-c of the respective phases. The other constructions are the same as the embodiment 1 or 2. In accordance with this embodiment 3, the driving electric current can be controlled with high accuracy while the driving electric current offset value of each phase of the three-phase alternating current electric motor is independent in each phase and is corrected by the driving electric current offset values Ioff-a, Ioff-b, Ioff-c of high accuracy from the electric motor driving electric current measuring circuit MCM.

Embodiment 4

In the above embodiments 1 to 3, the driving electric current offset signal SIoff is supplied to the input means 52 through the communication means 53. However, in the embodiment 4, a mode for supplying the driving electric current offset signal SIoff through a control network (CAN) 34 is set. In this case, no input means 52 is required so that cost can be reduced.

The electrically operated power steering controller and the adjusting method of its driving electric current offset in this invention are utilized in a power steering device of the automobile.

What is claimed is:

1. An adjusting method of a driving electric current offset in an electrically operated power steering controller comprising:

generating, by a driving electric current target signal generating means, a driving electric current target signal representing a driving electric current target value Itag for an electric motor for generating auxiliary steering torque;

generating, by an electric current detecting means, a driving electric current detecting signal representing a driving electric current value Imtr of said electric motor;

generating, by an offset correcting means, a corrected driving electric current signal representing a corrected driving electric current value Iamd provided by correcting the driving electric current value Imtr by using a driving electric current offset value Ioff of said electric motor when said driving electric current target value Itag is set to zero; and controlling, by an electric motor driving control means, the operation of said electric motor on the basis of the driving electric current target signal and the corrected driving electric current signal, wherein said offset correcting means generates the corrected driving electric current signal, and the offset correcting means has first and second input portions, and the driving electric current detecting signal is inputted to said first input portion, and input means for inputting a driving electric current offset signal representing the driving electric current offset value Ioff is connected to said second input portion, inputting the driving electric current offset signal representing the driving electric current offset value Ioff to said offset correcting means through said input means by a driving electric current measuring means, said driving electric current measuring means outputs an offset driving current signal representing the driving electric current offset value Ioff with accuracy higher than that of said driving electric current detecting means, and as a result, the corrected driving electric current signal is generated by using the driving electric current detecting signal detected by said electric current detecting means and the offset driving current signal with accuracy higher than that of said electric current detecting means outputted by said driving electric current measuring means.

2. The adjusting method of the driving electric current offset in the electrically operated power steering controller according to claim 1, wherein said driving electric current measuring means has an electric current measuring device for measuring the driving electric current offset value Ioff with accuracy higher than that of said driving electric current detecting means, and an A/D converter for converting the driving electric current offset value Ioff into a digital signal as the offset driving current signal, and the offset driving current signal is inputted to said offset correcting means through said input means.

3. An adjusting method of a driving electric current offset in an electrically operated power steering controller comprising:

generating, by a driving electric current target signal generating means, a driving electric current target signal representing a driving electric current target value Itag for an electric motor for generating auxiliary steering torque;

generating, by a driving electric current detecting means, a driving electric current detecting signal representing a driving electric current value Imtr of said electric motor;

generating, by an offset signal generating means, a driving electric current offset signal representing a driving electric current offset value Ioff of said electric motor when said driving electric current target value Itag is set to zero;

calculating, by an arithmetic means, an arithmetic value Iest=Itag−(Imtr−Ioff) on the basis of the driving electric current target signal, the driving electric current detecting signal and the driving electric current offset signal; and controlling, by an electric motor driving control means, the operation of said electric motor on the basis of the arithmetic value;

wherein the electrically operated power steering controller is constructed such that the driving electric current detecting signal and the driving electric current offset signal are supplied to said arithmetic means from routes different from each other, and input means is connected to said offset signal generating means;

the driving electric current offset signal representing the driving electric current offset value Ioff is inputted to said offset signal generating means through said input means by a driving electric current measuring means, said driving electric current measuring means measures the driving electric current offset value Ioff with accuracy higher than that of said driving electric current detecting means, and as a result, the arithmetic value Iest is calculated by using the driving electric current target signal, the driving electric current detecting signal detected by said driving electric current detecting means and the driving electric current offset signal with accuracy higher than that of the driving electric current detecting means outputted by said driving electric current measuring means.

4. The adjusting method of the driving electric current offset in the electrically operated power steering controller according to claim 3, wherein said driving electric current measuring means has an electric current measuring device for measuring the driving electric current offset value Ioff with accuracy higher than that of said driving electric current detecting means, and an A/D converter for converting said driving electric current offset value Ioff into a digital signal, and the digital signal is inputted to said offset signal generating means through said input means.

5. The adjusting method of the driving electric current offset in the electrically operated power steering controller according to claim 1, wherein the adjusting method executes a first step for generating the corrected driving electric current signal representing the value Iamd by using the driving electric current offset value Ioff outputted by said driving electric current measuring means when said driving electric current target value Itag is set to zero, and for driving the electric motor on the basis of the corrected driving electric current signal, and a second step for measuring the driving current value by using said driving electric current measuring means and for judging whether the driving current value measured in said first step lies within a predetermined tolerance or not, and if the driving current value does not lie within said predetermined tolerance, the adjusting method again executes said first step and said second step.

6. The adjusting method of the driving electric current offset in the electrically operated power steering controller according to claim 3, wherein the adjusting method executes a first step for calculating the arithmetic value Iest by using the driving electric current target signal, the driving electric current detecting signal and the driving electric current offset signal when said driving electric current target value Itag is set to zero, and for driving the electric motor on the basis of the arithmetic value, and a second step for measuring the driving current value by using said driving electric current measuring means and for judging whether the driving current value measured in said first step lies within a predetermined tolerance or not, and if the driving current value does not lie within said predetermined tolerance, the adjusting method again executes said first step and said second step.

* * * * *